US009503991B2

(12) United States Patent
Devison

(10) Patent No.: US 9,503,991 B2
(45) Date of Patent: Nov. 22, 2016

(54) METHOD FOR CONTROLLING POWER TRANSITIONS IN TRANSMITTER SYSTEMS

(75) Inventor: Stephen Arnold Devison, Kitchener (CA)

(73) Assignee: BlackBerry Limited, Waterloo (CA)

(*) Notice: Subject to any disclaimer, the term of this patent is extended or adjusted under 35 U.S.C. 154(b) by 402 days.

(21) Appl. No.: 12/641,508

(22) Filed: Dec. 18, 2009

(65) Prior Publication Data
US 2011/0151855 A1 Jun. 23, 2011

(51) Int. Cl.
H04W 52/26 (2009.01)
H04W 52/36 (2009.01)

(52) U.S. Cl.
CPC ......... H04W 52/262 (2013.01); H04W 52/362 (2013.01)

(58) Field of Classification Search
CPC .................... H04W 52/262; H04W 52/362
USPC ........... 455/24, 102, 108, 127.1, 127.4, 126, 455/422.1, 522, 574; 375/219, 350, 229, 375/295
See application file for complete search history.

(56) References Cited

U.S. PATENT DOCUMENTS

| 6,606,308 B1 * | 8/2003 | Genest et al. ............... 370/318 |
| 6,807,146 B1 * | 10/2004 | McFarland ............ H04L 5/023 370/208 |
| 7,190,965 B2 | 3/2007 | Wenzel et al. |
| 7,277,678 B2 | 10/2007 | Rozenblit et al. |
| 7,353,006 B2 | 4/2008 | Gels et al. |
| 2005/0227646 A1 | 10/2005 | Yamazaki et al. |
| 2005/0266809 A1 | 12/2005 | Weiss |
| 2006/0189284 A1 | 8/2006 | Yamawaki et al. |
| 2007/0015472 A1 * | 1/2007 | Murtojarvi et al. .......... 455/102 |
| 2007/0230616 A1 * | 10/2007 | Zolfaghari et al. ........... 375/297 |
| 2008/0287079 A1 * | 11/2008 | Matsui et al. ............. 455/127.1 |
| 2009/0291648 A1 * | 11/2009 | Lee ................................ 455/102 |
| 2010/0167670 A1 * | 7/2010 | Gilbert ....................... 455/127.2 |

OTHER PUBLICATIONS

European Search Report; May 28, 2010.
Office Action dated Jan. 16, 2013 for the corresponding Canadian Patent Application No. 2,718,818.

* cited by examiner

Primary Examiner — Inder Mehra
(74) Attorney, Agent, or Firm — Ridout & Maybee LLP

(57) ABSTRACT

A method for controlling a transmitter power control system in communication networks that include a modulation scheme having a non-constant amplitude envelope. The method includes generating a transmission signal and transitioning the transmission signal from a first specified power level to a second specified power level and having a transition period therebetween, and generating a constant amplitude envelope modulation of the transmission signal during the transition period. The method may further include generating a non-constant amplitude envelope modulation of the transmission signal at the first specified power level, switching to the constant amplitude envelope modulation of the transmission signal during the transition period and generating the non-constant amplitude envelope modulation of the transmission signal at the second specified power level. A mobile communication device may be used to perform the method.

17 Claims, 5 Drawing Sheets

METHOD FOR CONTROLLING POWER TRANSITIONS IN TRANSMITTER SYSTEMS

TECHNICAL FIELD

Example embodiments relate to controlling power transitions in transmitter systems, and in particular for such transmitter systems in communication networks having non-constant amplitude envelope modulation.

BACKGROUND

Examples of network systems which may incorporate non-constant amplitude envelope modulation include those which operate according to Universal Mobile Telecommunications System (UMTS)-related standards, example of which include 3GPP, WCDMA, HSPA, LTE, etc., as would be understood in the art. In many UMTS-related standards, there are transition periods wherein transmit power changes from one desired power level to another.

It may be difficult to monitor power at these transition periods. For example, some existing UMTS systems and devices use a root-mean-squared power calculation in order to monitor power. In order to do so, sampling along continuous capture times may be required to gather adequate statistics for performing the power calculations. However, such sampling may be difficult as there may not always be sufficient capture times available. This becomes especially difficult during power transition periods where the power is constantly changing.

Further, power detection and control of some UMTS systems and devices may require relatively complicated circuits or systems.

It would be advantageous to address some of the above-noted difficulties. Other difficulties of existing systems may also be appreciated in view of the foregoing.

DETAILED DESCRIPTION OF EXAMPLE EMBODIMENTS

Some example embodiments generally relate to dynamic control of an antenna system, for example to enable and disable performance of antenna diversity, such as receive diversity.

In accordance with an example embodiment, there is provided a method for controlling a transmitter power control system in communication networks that include a modulation scheme having a non-constant amplitude envelope. The method includes: generating a transmission signal and transitioning the transmission signal from a first specified power level to a second specified power level and having a transition period therebetween, and generating a constant amplitude envelope modulation of the transmission signal during the transition period.

The method may further include generating a non-constant amplitude envelope modulation of the transmission signal at the first specified power level, switching to the constant amplitude envelope modulation of the transmission signal during the transition period and generating the non-constant amplitude envelope modulation of the transmission signal at the second specified power level.

In accordance with another example embodiment, there is provided a transmitter power control system for use in communication networks that include a modulation scheme having a non-constant amplitude envelope. The transmitter power control system includes: a transmitter unit for generating a transmission signal and configured for transitioning the transmission signal from a first specified power level to a second specified power level and having a transition period therebetween, the transmitter unit generating a constant amplitude envelope modulation of the transmission signal during the transition period.

In accordance with a further example embodiment, there is provided a computer program product including a computer readable medium storing instructions in the form of executable program code for causing the computer device to perform the described methods.

Some embodiments described herein generally relate to computer devices such as handheld electronic devices. Examples of handheld electronic devices include mobile communication devices such as pagers, cellular phones, Global Positioning System (GPS) navigation devices and other satellite navigation devices, smart phones, wireless organizers and personal digital assistants. Some embodiments may also be applied to notebook computers such as wireless-enabled notebook computers.

Figure 2:
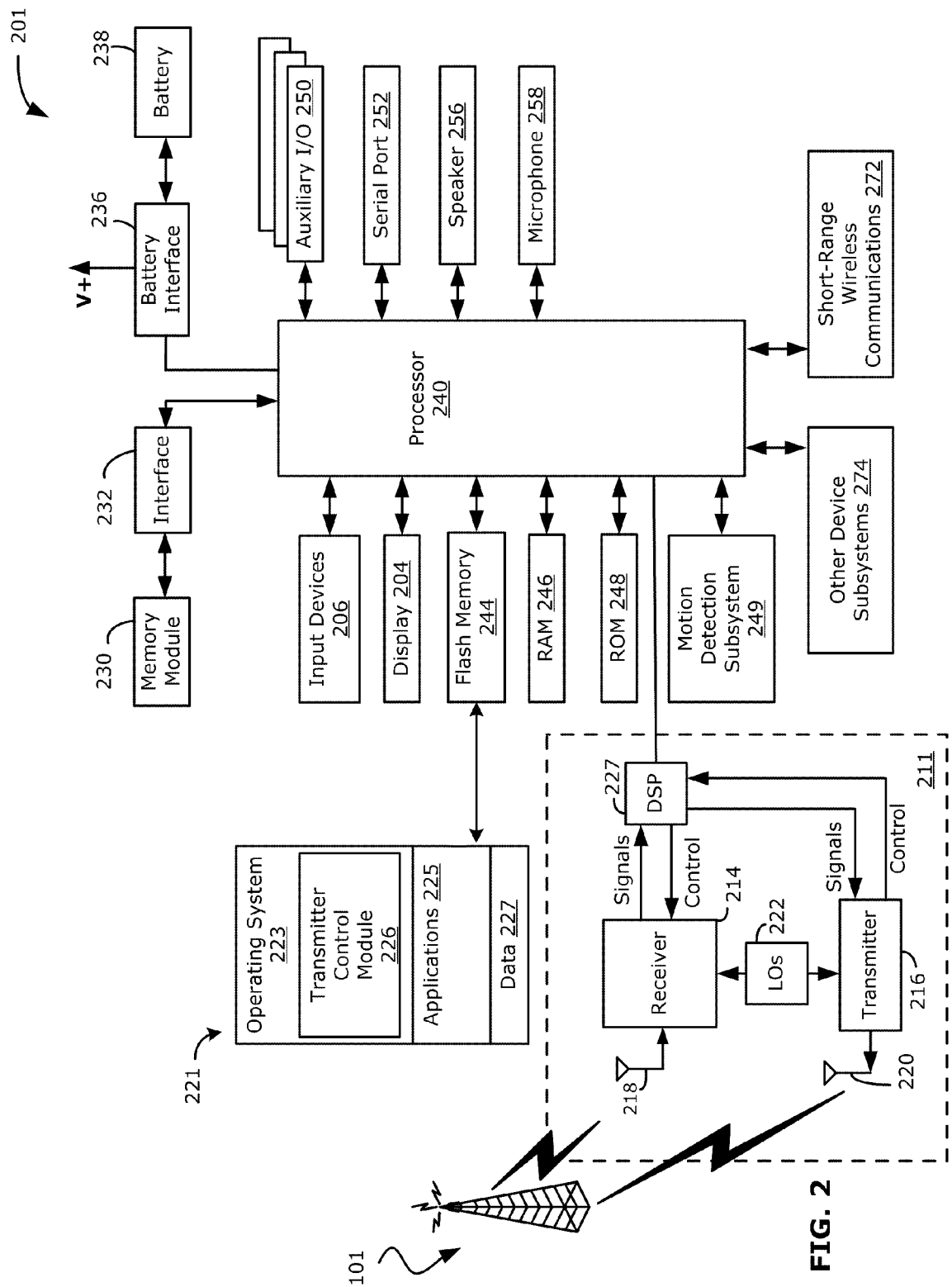
FIG. 2 shows a block diagram illustrating a mobile communication device in accordance with an example embodiment.

Reference is now made to FIG. 2 which illustrates a mobile communication device 201 in which example embodiments can be applied. The mobile communication device 201 is a two-way communication device having at least data and possibly also voice communication capabilities, and the capability to communicate with other computer systems, for example, via the Internet. Depending on the functionality provided by the mobile communication device 201, in various embodiments the device may be a data communication device, a multiple-mode communication device configured for both data and voice communication, a handheld mobile device such as a smartphone, mobile telephone or a PDA (personal digital assistant) enabled for wireless communication, or a computer system with a wireless modem.

The mobile communication device 201 includes a rigid case (not shown) housing the components of the device 201. The internal components of the device 201 are constructed on a printed circuit board (PCB). The mobile communication device 201 includes a controller including at least one processor 240 (such as a microprocessor) which controls the overall operation of the device 201. The processor 240 interacts with device subsystems such as a communication subsystem 211 for exchanging wireless (e.g. radio frequency) signals with a wireless network 101 to perform communication functions. The processor 240 interacts with additional device subsystems including a display (screen) 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 272, and other device subsystems generally designated as 274. Some of the subsystems shown in FIG. 2 perform communication-related functions, whereas other subsystems may provide "resident" or on-device functions.

The device 201 may include a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The processor 240 operates under stored program control and executes software modules 221 stored in memory such as persistent memory, for example, in the flash memory 244. As illustrated in FIG. 2, the software modules 221 include operating system software 223 and software applications. A transmitter control module 226 may, among other things, be implemented by the operating system 223 or through a stand-alone software application 225, or components (e.g., the DSP 227) of the communication subsystem 211, or combined together in one or more of the operating system 223, applications 225 and communication subsystem 211. In some example embodiments, the functions performed by the transmitter control module 226 may be realized as a plurality of independent elements, rather than a single integrated element, and any one or more of these elements may be implemented as parts between the operating system 223 and other software applications 225.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 may include a range of applications, including, for example, an address book application, a messaging application, a calendar application, and/or a notepad application. In some embodiments, the software applications 225 include an email message application, a push content viewing application, a voice communication (i.e. telephony) application, a map application, and a media player application. Each of the software applications 225 may include layout information defining the placement of particular fields and graphic elements (e.g. text fields, input fields, icons, etc.) in the user interface (i.e. the display screen 204) according to the application.

In some embodiments, the mobile communication device 201 also includes a removable memory card 230 (typically comprising flash memory) and a memory card interface 232. Network access typically associated with a subscriber or user of the mobile communication device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile communication device 201 in order to operate in conjunction with the wireless network 101.

The mobile communication device 201 stores data 227 in an erasable persistent memory, which in one example embodiment is the flash memory 244. In various embodiments, the data 227 includes service data comprising information required by the mobile communication device 201 to establish and maintain communication with the wireless network 101. The data 227 may also include user application data such as email messages, address book and contact information, calendar and schedule information, notepad documents, image files, and other commonly stored user information stored on the mobile communication device 201 by its user, and other data. The data 227 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the device memory.

In some embodiments, the auxiliary input/output (I/O) subsystems 250 may comprise an external communication link or interface, for example, an Ethernet connection. The mobile communication device 201 may comprise other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may comprise a navigational tool such as a clickable trackball or thumbwheel, a digital camera, or a vibrator for providing vibratory notifications in response to various events on the device 201 such as receipt of an electronic communication or incoming phone call, or for other purposes such as haptic feedback (touch feedback).

The serial data port 252 may be used for synchronization with a user's host computer system (e.g., computer 117 (FIG. 1)). The serial data port 252 enables a user to set preferences through an external device or software application and extends the capabilities of the mobile communication device 201 by providing for information or software downloads to the mobile communication device 201 other than through the wireless network 101. The alternate download path may, for example, be used to load an encryption key onto the mobile communication device 201 through a direct, reliable and trusted connection to thereby provide secure device communication.

In some embodiments, the mobile communication device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system 117 using standard connectivity protocols. When a user connects their mobile communication device 201 to the host computer system 117 via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable Bluetooth® connection to the host computer system 117 for processing.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile communication device 201 during or after manufacture. Additional applications and/or upgrades to the operating system 223 or software applications 225 may also be loaded onto the mobile communication device 201 through the wireless network 101, the auxiliary I/O subsystem 250, the serial port 252, the short-range communication subsystem 272, or other suitable subsystems 274 or wireless communication interfaces. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 242. A user of the mobile communication device 201 may also compose data items, such as email messages, for example, using the input devices in conjunction with the display screen 204. These composed items may be transmitted through the communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display screen 204 may also be used to provide an indication of the identity of a calling party, duration of a voice call, or other voice call related information.

The mobile communication device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201. A battery level indicator (not shown) may also be included for detecting and indicating the remaining batter power.

Figure 1:
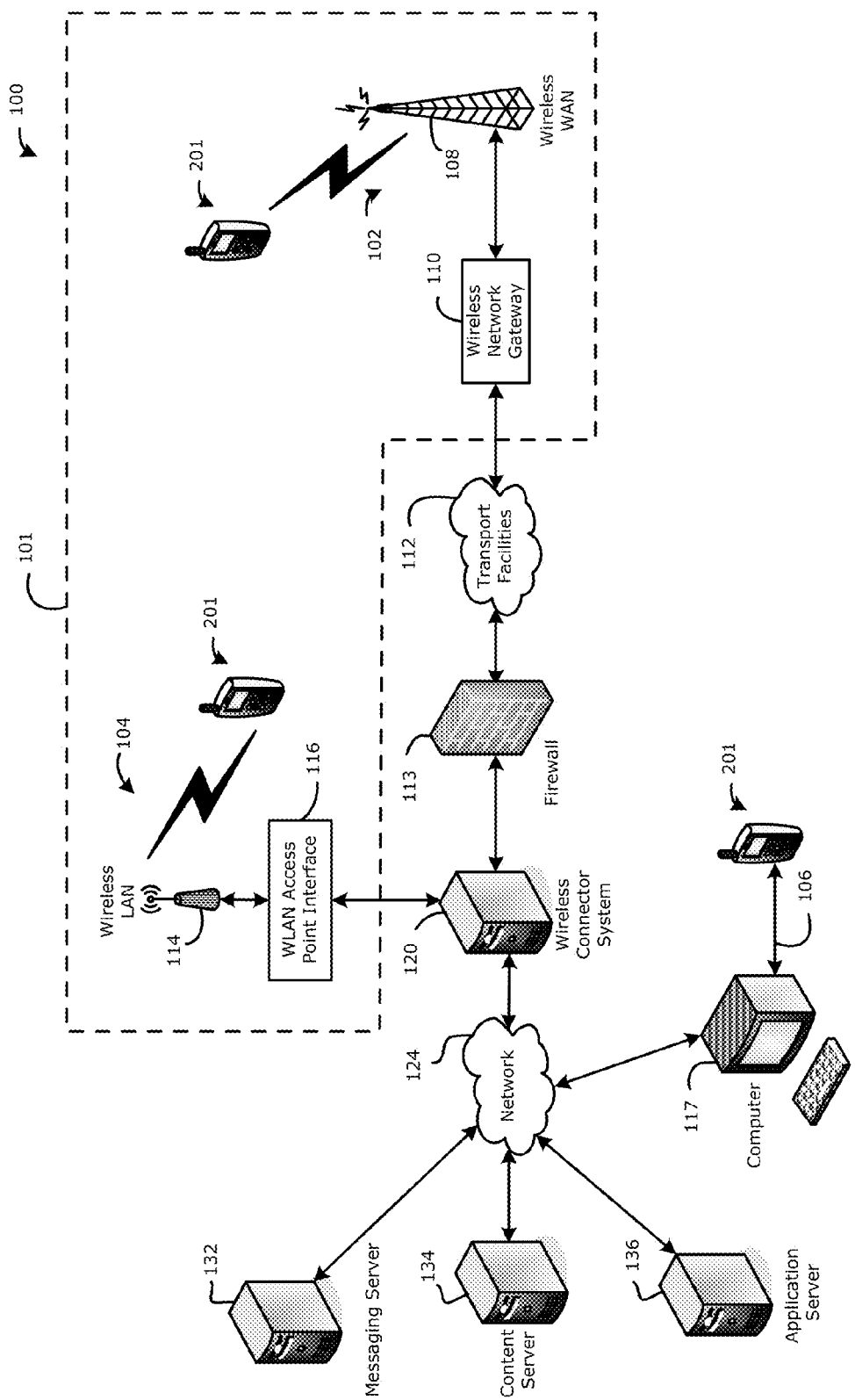
FIG. 1 shows a block diagram illustrating a communication system including a mobile communication device to which example embodiments can be applied.

In order to facilitate an understanding of one possible environment in which example embodiments described herein can operate, reference is made to FIG. 1 which shows in block diagram form a communication system 100 in which example embodiments of the present disclosure can be applied. The communication system 100 comprises a number of mobile communication devices 201 which may be connected to the remainder of system 100 in any of several different ways. Accordingly, several instances of mobile communication devices 201 are depicted in FIG. 1 employing different example ways of connecting to system 100. Mobile communication devices 201 are connected to the wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to a modulation scheme having a non-constant amplitude envelope, for example UMTS (Universal Mobile Telecommunication Systems). The WWAN 102 may also be configured for one or more additional wireless network types for communication with other devices, such as: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), HSPDA (High-Speed Downlink Packet Access), LTE (Long Term Evolution), IEEE 802.16e (also referred to as Worldwide Interoperability for Microwave Access or "WiMAX), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly as indicated by the dashed line if FIG. 1 via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), and a content server 134 for providing content such as Internet content or content from an organization's internal servers, and application servers 136 for implementing server-based applications such as instant messaging (IM) applications to mobile communication devices 201.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132, content server 134 or application servers 136. Conversely, the wireless connector system 120 sends data packets received, for example, from the messaging server 132, content server 134 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination.

The mobile communication device 201 may alternatively connect to the wireless connector system 120 using a computer 117, such as desktop or notebook computer, via the network 124. A link 106 or data connection may be provided for exchanging information (including synchronization data) between the mobile communication device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. The teachings herein may be employed in connection with any other type of network and associated devices that are effective in implementing or facilitating wireless communication. Suitable variations of the communication system will be understood to a person of skill in the art and are intended to fall within the intended scope.

Figure 5:
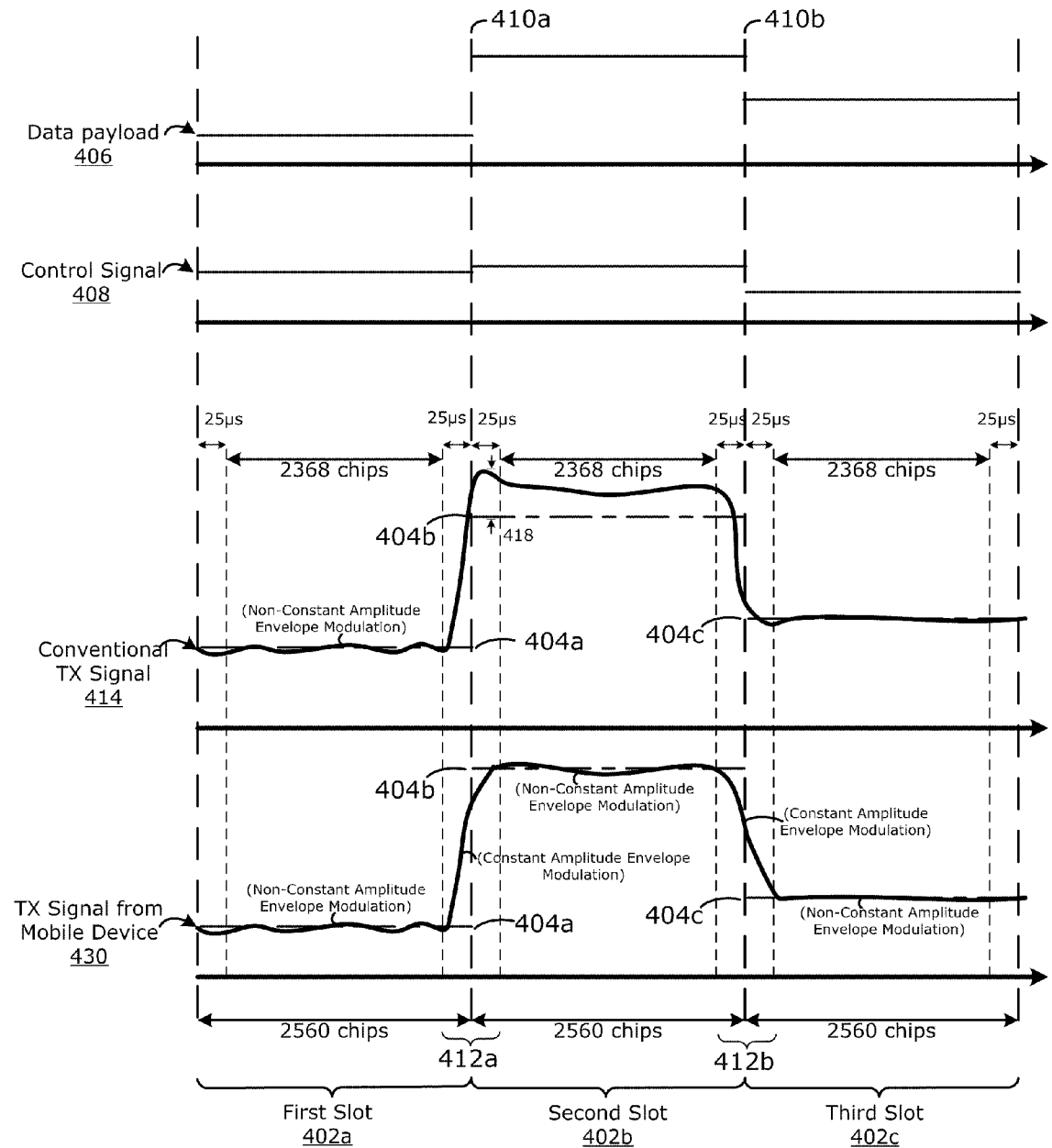
FIG. 5 shows an example graph illustrating example transmitted power signals in a network which includes non-constant amplitude envelope modulation scheme.

Systems and method in accordance with example embodiments for controlling power transitions in transmitter systems will now be described, with reference to FIG. 5, which shows a graph 400 illustrating example transmitted power signals within the WWAN 102 (FIG. 1). In example embodiments the WWAN 102 conforms to a modulation scheme having a non-constant amplitude envelope, for example UMTS (Universal Mobile Telecommunication Systems). Universal Mobile Telecommunications System (UMTS) is a standard for 3G wireless networks, as defined by the International Telecommunications Union. Examples of Universal Mobile Telecommunications System (UMTS)-related standards include 3GPP, WCDMA, HSPA, and LTE, as would be understood in the art. As illustrated in FIG. 5, UMTS may include a communication scheme wherein time intervals are separated into a number of slots (collectively or individually referred to as 402), illustrated as first slot 402a, second slot 402b, and third slot 402c. Slot boundaries 410a, 410b are also shown for separation of the slots 402. In UMTS, each slot 402 has a length of about ⅔ milliseconds, and which include 2560 chips in each slot 402. UMTS also provides that 15 slots form a 10 millisecond frame (i.e., 38,400 chips per frame). Typically, each slot 402 includes a specified power level to be transmitted 404, which comprises the aggregate of a specified data payload power level requirement 406 and a specified control signal (or merely "signal") power level requirement 408. As shown in FIG. 5, a first specified power level 404a corresponds to first slot 402a, a second specified power level 404b corresponds to second slot 402b, and a third specified power level 404c corresponds to third slot 404c. In UMTS, the specified data payload is typically referred to as Dedicated Physical Data Channel (DPDCH), while the specified control signal is referred to as Dedicated Physical Control Channel (DPCCH).

Within each slot 402, the signal to be transmitted at the specified power level may for example be transmitted for a duration of 2368 chips. Between slots, there are first and second transition periods 412a, 412b wherein the transmitted power level to be transmitted changes from one power level to another. An example typical transition period, as shown, is 192 chips which corresponds to about 50 microseconds (comprised of two 96 chips or 25 microsecond periods at opposing sides of the slot boundary 410). In existing UMTS systems, there may be no specific requirements regarding monitoring or controls during the transition periods. It is recognized herein that, since UMTS typically does not have any specific protocol or scheme that must be followed during the transition periods 412, there may be opportunities to manipulate the transmitted signal, for example for monitoring and control during the transition periods 412.

For example, an example mean power of a conventional transmitted signal 414 from a conventional device is shown in FIG. 5 for use in UMTS systems. Such existing devices may use a root-mean-squared power calculation in order to monitor and control the power of the transmitted signal 414. In order to do so, sampling along continuous capture times may be required by the device to gather adequate statistics for performing the power calculations. However, such sampling may be difficult as there may not always be sufficient capture times available. This becomes especially difficult during power level transition periods wherein the power level is constantly changing.

Another example difficulty with existing devices is that, during the first transition period 412a, there may be an overshoot 418, as shown, which may last for the duration of the entire slot 402b, when compared to the desired target power level 404b. This may waste power-generating resources which is generally now desired. Similarly, at the third slot 402c, there may be an overshoot or undershoot of the transmitted signal 414 (due to the errors in estimation) with respect to the desired target power level 404b. This may lead to additional inefficiencies in the transmitted power.

Referring again to FIG. 2, in some example embodiments, the mobile communication device 201 using the communication subsystem 211 is enabled for controlling power transitions for use in UMTS-implemented systems. Generally, the mobile communication device 201 may be configured for generating a transmission signal and transitioning the transmission signal from a first specified power level to a second specified power level and having a transition period therebetween. The mobile communication device 201 may be configured for generating a non-constant amplitude envelope modulation of the transmission signal at the first specified power level, switching to a constant amplitude envelope modulation of the transmission signal during the transition period, and generating the non-constant amplitude envelope modulation of the transmission signal at the second specified power level. Examples of constant amplitude envelope modulation include QPSK, MSK, GMSK, FSK, GFSK, as would be understood in the art.

In example embodiments, the communication subsystem 211 may generally be used for enabling wireless communications to be transmitted, and in some embodiments received, by the mobile communication device 201. The communication subsystem 211 may for example be used by any of the various subsystems of the mobile communication device 201 which may require wireless communications.

The communication subsystem 211 includes an antenna system including a receiver unit 214, a transmitter unit 216, and associated components, local oscillators (LOs) 222, and a processing module such as a digital signal processor (DSP) 227. The DSP 227 acts as a controller or local controller for the communication subsystem 211, and may be in communication with the transmitter control module 226. The receiver unit 214 is associated with antenna element 218, while the transmitter unit 216 is associated with antenna element 220. As would be understood in the art, the antenna elements 218, 220 may be embedded or internal to the mobile communication device 201, and formed of at least some conductive material for receiving or transmitting (or both) of electromagnetic signals. Although antenna elements 218 and 220 are illustrated separately, in some example embodiments at least some of the antenna elements 218, 220 are shared by both receiver and transmitter, and enabled for both transmitting and receiving. As will be apparent to those skilled in the field of communication, the particular design of the wireless communication subsystem 211 depends on the wireless network 101 in which mobile communication device 201 is intended to operate.

The mobile communication device 201 may communicate with any one of a plurality of fixed transceiver base stations 108 (or, in some embodiments, fixed receiver base stations) of the wireless network 101 within its geographic coverage area. The mobile communication device 201 may send and receive communication signals over the wireless network 101 after the required network registration or activation procedures have been completed. Signals received by the antenna elements 218 through the wireless network 101 are input to the receiver unit 214, which may perform such receiver functions as signal amplification, signal combining, frequency down conversion, filtering, channel selection, etc., as well as analog-to-digital (A/D) conversion, as would be understood in the art. A/D conversion of a received signal allows more complex communication functions such as demodulation and decoding to be performed in the DSP 227. In a similar manner, signals to be transmitted are processed, including modulation and encoding, for example, by the DSP 227. These DSP-processed signals are input to the transmitter unit 216 for digital-to-analog (D/A) conversion, frequency up conversion, filtering, amplification, and transmission to the wireless network 101 via the antenna 220. The DSP 227 not only processes communication signals, but may also provide for receiver and transmitter control. For example, the gains applied to communication signals in the receiver unit 214 and the transmitter unit 216 may be adaptively controlled through automatic gain control algorithms implemented in the DSP 227.

Figure 3:
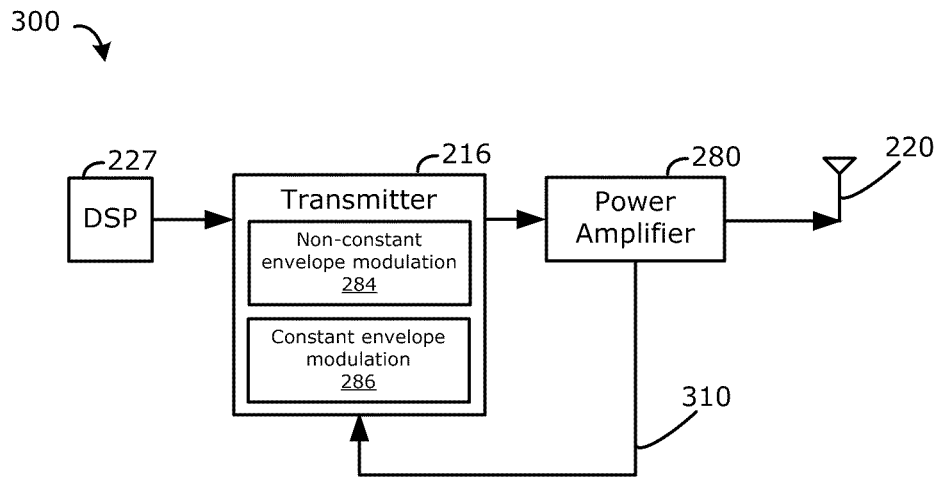
FIG. 3 shows a block diagram illustrating in detail an example transmitter power control system to be used in the mobile device of FIG. 2, in accordance with an example embodiment.

Reference is now made to FIG. 3, which shows in detail an example transmitter power control system 300 to be used in the communication subsystem 211, in accordance with an example embodiment. Similar reference numbers may be used for convenience and ease of reference. As shown, the transmitter power control system 300 includes a power amplifier 280 between the transmitter unit 216 and the antenna element 220, wherein the transmitter unit 216 receives a signal to be transmitted from the DSP 227. The power amplifier 280 may be used to receive a signal and amplify the signal for transmission using the antenna element 220. The transmitter power control system 300 also includes a closed feedback loop 310 from the power amplifier 280 to the transmitter 216. It is also understood in the art that the power amplifier 280 may also include some internal feedback loop (to control the output), which would be considered a separate feedback. In example embodiments, it can be understood that the transmitter power control system 300 may be implemented by digital components, analog components, or a combination or sub-combination of digital and analog components.

The transmitter unit 216 may also be configured for various modes of processing of the signal to be transmitted. As shown, the transmitter unit 216 may include a non-constant amplitude envelope modulation module 284 and a constant amplitude envelope modulation module 286. In example embodiments, the transmitter unit 216 is enabled to perform a non-constant amplitude envelope modulation on the transmitted signal as well as a constant amplitude envelope modulation, and may be configured to switch between modulation types. The feedback loop 310 may for example be used to facilitate constant amplitude envelope modulation. In example embodiments, the transmitter unit 216 may also perform some aspects of the DSP 227, or vice versa.

Figure 4:
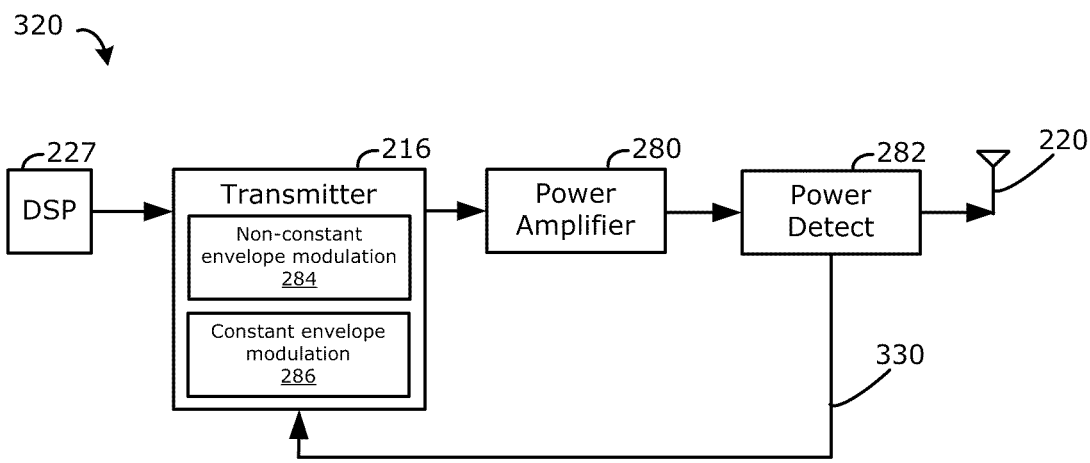
FIG. 4 shows a block diagram illustrating in detail another example transmitter power control system to be used in the mobile device of FIG. 2, in accordance with another example embodiment.

Reference is now made to FIG. 4, which shows in detail another example transmitter power control system 320 to be used in the communication subsystem 211, in accordance with another example embodiment. In this example embodiment (when compared to FIG. 3), a separate power detect unit 282 may be used. Similar reference numbers may be used for convenience and ease of reference. As shown in FIG. 4, the transmitter power control system 320 includes the power amplifier 280 between the transmitter unit 216 and the antenna element 220, wherein the transmitter unit 216 receives a signal to be transmitted from the DSP 227. The power detect unit 282 receives an amplified signal from the power amplifier 280 which may be used for monitoring of the signal. The transmitter power control system 300 also includes a closed feedback loop 330 from the power detect unit 282 to the transmitter 216.

Reference is again made to FIG. 5, which shows an example transmitted signal 430 transmitted by the mobile communication device 201 in accordance with an example embodiment. Similar to the above-noted conventional transmitted signal 414, within each slot 402 there is a specified power level to be transmitted 404a, 404b, 404c. Again, there are first and second transition periods 412a, 412b between slots 402. At the first slot 402a, the transmitter 216 of the mobile communication device 201 generates the transmitted signal 430 using non-constant amplitude envelope modulation, so that there is suitable communications within UMTS systems. At the first transition period 412a, the transmitter 216 generates the transmitted signal 430 using constant amplitude envelope modulation. This may include "switching" to a constant amplitude envelope modulation mode. Since the signal is modulating using constant amplitude envelope, this may for example assist in monitoring (e.g., calculation of transmitted power) and control of the transmitted signal 430. In other words, the amplitude envelope is known, and for example sampling for root-mean-square values over a period of time may not be required. In addition, such a transmitted signal 430 using constant amplitude envelope modulation may be possible as many UMTS systems may not have any specific protocol or scheme that must be followed during the transition period 412a.

Continuing with the example, at the second slot 402b, the transmitter 216 generates the transmitted signal 430 using non-constant amplitude envelope modulation. At the second transition period 412b, the transmitter 216 generates the transmitted signal 430 once again using constant amplitude envelope modulation. At the third slot 402c, the transmitter 216 generates the transmitted signal 430 using non-constant amplitude envelope modulation. Such a process may continue and repeat, as appropriate.

In some instances, it can be appreciated that as little as one RF sample (or chip sample) may be used to gain an accurate power calculation of the transmitted signal 430.

It can also be appreciated that, during constant amplitude envelope modulation, there are further opportunities for spectral shaping processes to be performed by the DSP 227 or transmitter 216. In an example embodiment, additional spectral filtering processes may be performed onto the spectral shape of the transmitted signal. In other example embodiments, spectral shaping techniques as in GSM may be used on the transmitted signal.

It can further be appreciated that, in some example embodiments, only the mobile device 201 may need be configured to implement aspects of the above-described embodiments. Thus, in such embodiments, a WWAN 102 implementing UMTS may not require modification and may, in fact, be unaware of any such implementations from the transmissions of the mobile device 201.

Figure 6:
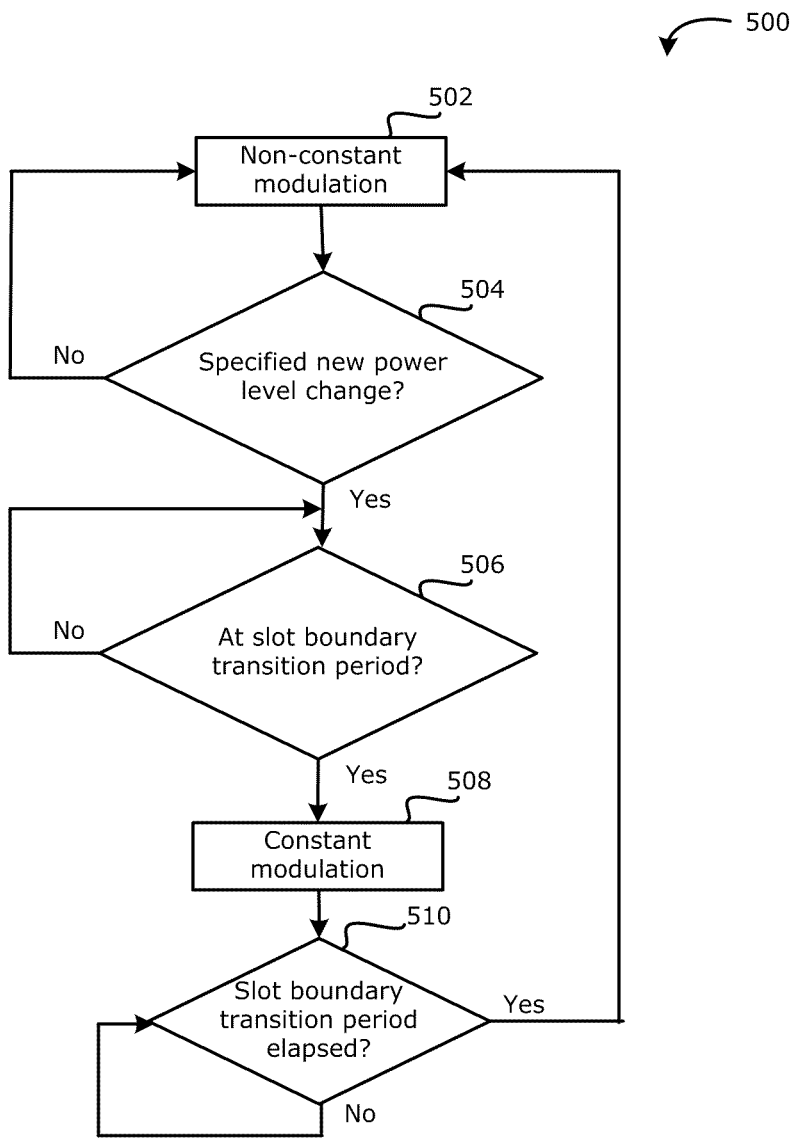
FIG. 6 shows a flowchart illustrating example operations for controlling power transmissions of the mobile communication device of FIG. 2 in accordance with an example embodiment.

Reference is now made to FIG. 6, which shows an example operation 500 as performed by the communication subsystem 211 in accordance with an example embodiment. At process 504, the transmitter unit 216 operates by generating a transmitted signal using non-constant amplitude envelope modulation. At process 502, the transmitter unit 216 determines whether there is a change to a new specified power level. At process 506, the transmitter unit 216 continues to operate under non-constant amplitude modulation until the transition period at the slot boundary is reached. Thus, at process 506, it is determined whether the slot boundary is reached. If not, the transmitter unit 216 continues to operate at process 506 until the slot boundary is reached. If so, at process 508, the transmitter unit 216 operates at the slot boundary (i.e., the transition period) by generating a transmitted signal using constant amplitude envelope modulation. At this stage, the power level of the transmitted signal may for example be readily monitored and calculated as constant amplitude envelope modulation is being used here. At process 510, the transmitter unit 216 may determine whether a predetermined interval of the transition period 412 of the slot has elapsed, for example after 192 chips or about 50 microseconds, and if so returns to operation using non-constant amplitude envelope modulation (process 502).

In an alternate embodiment, referring again to process 510, the transmitter unit 216 may instead determine whether the new specified power level is reached, which may for example occur prior to the end of the slot boundary transition period, and if so proceed to process 502, i.e., operation using non-constant amplitude envelope modulation. Other triggers may also be used in other embodiments.

While the operations 500 have been described as occurring in a particular order for exemplary purposes, it will be appreciated to persons skilled in the art that some of the processes or steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

Variations of the example embodiments are possible. For example, some example embodiments may be applied to any transmitter power control system, which may or may not be implemented by the mobile communication device 201.

While some aspects have been described in terms of methods, a person of ordinary skill in the art will understand that the those aspects are also directed to various apparatus such as a handheld electronic device including components for performing at least some of the aspects and features of the described methods, be it by way of hardware components, software or any combination of the two, or in any other manner. Similarly, aspects described as mobile communication devices may apply to associated methods for performing the same aspects. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of present embodiments.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

What is claimed is:

1. A method for controlling a transmitter power control system in communication networks that include a modulation scheme having a non-constant amplitude envelope, wherein the communication networks include a Universal Mobile Telecommunications System (UMTS) system, the method comprising:
generating a transmission signal using the non-constant amplitude envelope modulation scheme, in the UMTS system, with a non-constant amplitude envelope modulation of the transmission signal at a first specified power level;
transitioning the transmission signal from the first specified power level to a second specified power level and having a transition period therebetween, including generating a constant amplitude envelope modulation, using one of Quadrature Phase Shift Keying (QPSK), minimum-shift keying (MSK), Gaussian Minimum Shift Keying (GMSK), Frequency-Shift Keying (FSK), and Gaussian Frequency-Shift Keying (GFSK), of the transmission signal with an associated amplitude envelope during the whole transition period; and generating the non-constant amplitude envelope modulation of the transmission signal at the second specified power level.

2. A method as claimed in claim 1, further comprising amplifying the transmission signal resulting in an amplified transmission signal.

3. A method as claimed in claim 2, further comprising receiving the amplified transmission signal in a closed feedback loop for generating of the constant amplitude envelope modulation of the transmission signal.

4. A method as claimed in claim 1, further comprising monitoring a power level of the transmission signal at the transition period using the amplitude envelope of the constant amplitude envelope modulation.

5. A method as claimed in claim 1, wherein the first specified power level is associated with a first slot of the UMTS system and the second specified power level is associated with a second slot of the UMTS system.

6. A method as claimed in claim 1, wherein the transition period includes a predetermined period at a slot boundary of the UMTS system.

7. A method as claimed in claim 1, wherein the second specified power level is dependent on a specified data payload power level and a specified control signal power level.

8. A method as claimed in claim 1, wherein generating the constant amplitude envelope modulation comprises implementing an angle modulation of the transmission signal.

9. A transmitter power control system for use in communication networks that include a modulation scheme having a non-constant amplitude envelope, wherein the communication networks include a Universal Mobile Telecommunications System (UMTS) system, the transmitter power control system comprising:

a transmitter unit for generating a transmission signal using the non-constant amplitude envelope modulation scheme, in the UMTS system, with a non-constant amplitude envelope modulation of the transmission signal at a first specified power level and being configured for transitioning the transmission signal from the first specified power level to a second specified power level and having a transition period therebetween, including generating a constant amplitude envelope modulation, using one of Quadrature Phase Shift Keying (QPSK), minimum-shift keying (MSK), Gaussian Minimum Shift Keying (GMSK), Frequency-Shift Keying (FSK), and Gaussian Frequency-Shift Keying (GFSK), with an associated amplitude envelope of the transmission signal during the whole transition period, and being configured for generating the non-constant amplitude envelope modulation of the transmission signal at the second specified power level.

10. A transmitter power control system as claimed in claim 9, further comprising a power amplifier for receiving the transmission signal and having an output for amplifying the transmission signal resulting in an amplified transmission signal.

11. A transmitter power control system as claimed in claim 10, further comprising the transmitter unit being configured for receiving the amplified transmission signal in a closed feedback loop for generating of the constant amplitude envelope modulation of the transmission signal.

12. A transmitter power control system as claimed in claim 9, further comprising a power detect unit for monitoring a power level of the transmission signal at the transition period using the amplitude envelope of the constant amplitude envelope modulation.

13. A transmitter power control system as claimed in claim 9, wherein the first specified power level is associated with a first slot of the UMTS system and the second specified power level is associated with a second slot of the UMTS system.

14. A transmitter power control system as claimed in claim 9, wherein the transition period includes a predetermined period at a slot boundary of the UMTS system.

15. A transmitter power control system as claimed in claim 9, wherein the second specified power level is dependent on a specified data payload power level and a specified control signal power level.

16. A transmitter power control system as claimed in claim 9, wherein the transmitter unit is included within a mobile communication device.

17. A transmitter power control system as claimed in claim 9, wherein generating the constant amplitude envelope modulation comprises implementing an angle modulation of the transmission signal.

* * * * *